(12) United States Patent
Dublish et al.

(10) Patent No.: US 7,503,074 B2
(45) Date of Patent: Mar. 10, 2009

(54) SYSTEM AND METHOD FOR ENFORCING LOCATION PRIVACY USING RIGHTS MANAGEMENT

(75) Inventors: Pratul Dublish, Sammamish, WA (US); Timothy S. McGrath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 907 days.

(21) Appl. No.: 10/928,023

(22) Filed: Aug. 27, 2004

(65) Prior Publication Data

US 2006/0046744 A1   Mar. 2, 2006

(51) Int. Cl.
*G06F 7/04* (2006.01)
*G06F 17/30* (2006.01)
*G06K 9/00* (2006.01)
*H03M 1/68* (2006.01)
*H04K 1/00* (2006.01)
*H04L 9/00* (2006.01)
*H04L 9/32* (2006.01)
*H04N 7/16* (2006.01)

(52) U.S. Cl. .......................... 726/27; 726/26; 713/168
(58) Field of Classification Search .................. None
See application file for complete search history.

(56) References Cited

U.S. PATENT DOCUMENTS

| | | |
|---|---|---|
| 5,890,070 A | 3/1999 | Hamada |
| 6,011,461 A | 1/2000 | Luper |
| 6,091,956 A | 7/2000 | Hollenberg |
| 6,094,164 A | 7/2000 | Murphy |
| 6,098,048 A | 8/2000 | Dashefsky et al. |
| 6,181,689 B1 | 1/2001 | Choung et al. |
| 6,223,291 B1 * | 4/2001 | Puhl et al. ............... 726/28 |

(Continued)

FOREIGN PATENT DOCUMENTS

WO    WO 98/52379 A1    11/1998

(Continued)

OTHER PUBLICATIONS

Cheverst, K., et al., "Providing Tailored (Context-Aware) Information to City Visitors," *Proceedings of the International Conference on Adaptive Hypermedia and Adaptive Web-Based Systems*, Trento, Italy, Aug. 28-30, 2000, pp. 73-85.

(Continued)

*Primary Examiner*—Nasser G Moazzami
*Assistant Examiner*—Oscar A Louie
(74) *Attorney, Agent, or Firm*—Merchant & Gould

(57) ABSTRACT

A system and method for securely delivering the location information of a mobile device to a location consumer is presented. In operation, the mobile device user issues a license to a location consumer. The license identifies the location consumer and any conditions the mobile device user places on the license. The license is encrypted such that it cannot be modified without invalidating the license. The license is submitted in a location request by the location consumer. A location information server receives the request, validates that the license was issued to the location consumer and that the location request conforms to the conditions of the license. If so, the location information server obtains the mobile device's location information, generates a location response, encrypts some of the location response, and returns the location response to the location consumer.

54 Claims, 6 Drawing Sheets

U.S. PATENT DOCUMENTS

| | | | |
|---|---|---|---|
| 6,374,177 | B1 | 4/2002 | Lee et al. |
| 6,415,318 | B1 | 7/2002 | Aggarwal et al. |
| 6,489,893 | B1 | 12/2002 | Richards et al. |
| 6,522,875 | B1 | 2/2003 | Dowling et al. |
| 6,615,131 | B1 | 9/2003 | Rennard et al. |
| 6,628,928 | B1 | 9/2003 | Crosby et al. |
| 6,741,853 | B1 | 5/2004 | Jiang et al. |
| 6,784,809 | B2 | 8/2004 | Flick |
| 6,813,501 | B2 | 11/2004 | Kinnunen et al. |
| 6,847,824 | B1 | 1/2005 | Contractor |
| 6,853,848 | B2 | 2/2005 | Sahinoglu |
| 6,853,911 | B1 | 2/2005 | Sakarya |
| 6,873,258 | B2 | 3/2005 | Marples et al. |
| 6,898,434 | B2 | 5/2005 | Pradhan et al. |
| 6,909,903 | B2 | 6/2005 | Wang |
| 6,922,723 | B1 | 7/2005 | Sharp et al. |
| 6,925,481 | B2 | 8/2005 | Singhal et al. |
| 6,944,679 | B2 | 9/2005 | Parupudi et al. |
| 2001/0049754 | A1 | 12/2001 | Kawase |
| 2001/0055975 | A1* | 12/2001 | McDonnell et al. .......... 455/456 |
| 2002/0080968 | A1* | 6/2002 | Olsson ....................... 380/270 |
| 2003/0035544 | A1 | 2/2003 | Herle et al. |
| 2003/0109988 | A1 | 6/2003 | Geissler et al. |
| 2003/0186710 | A1 | 10/2003 | Muhonen et al. |
| 2004/0171380 | A1 | 9/2004 | Puranik et al. |
| 2004/0180668 | A1 | 9/2004 | Owens et al. |

FOREIGN PATENT DOCUMENTS

WO    WO 03/065754 A1    8/2003

OTHER PUBLICATIONS

Dogac, A., and A. Turner, "Issues in Mobile Electronic Commerce," *Journal of Database Management* 13(1):36-42, Jan.-Mar. 2002.

Kurashima, A., et al., "Mobile Location Services Platform With Policy-Based Privacy Control," *NEC Research and Development* 44(4):368-373, Oct. 2003.

Marmasse, N., and C. Schmandt, "Location-Aware Information Delivery With *ComMotion*," *Proceedings of the 2nd International Symposium on Handheld and Ubiquitous Computing*, Bristol, UK, Sep. 25-27, 2000, pp. 157-171.

Oppermann, R., and M. Specht, "A Context-Sensitive Nomadic Exhibition Guide," *Proceedings of the Second International Symposium on Handheld and Ubiquitous Computing*, Bristol, UK, Sep. 25-27, 2000, pp. 127-142.

Schilit, B., et al., "Wireless Location Privacy Protection," *Computer* 36(12):135-137, Dec. 2003.

Snekkenes, E., "Concepts for Personal Location Privacy Policies," *Proceedings of the 3rd ACM Conference on Electronic Commerce*, Tampa, Fla., Oct. 14-17, 2001, pp. 48-57.

Bhela, H.S., et al., "System and Method for Providing Personal Location Information to Location Consumers From a Location Services Server," U.S. Appl. No. 10/184,138, filed Jun. 27, 2002.

\* cited by examiner

SYSTEM AND METHOD FOR ENFORCING LOCATION PRIVACY USING RIGHTS MANAGEMENT

FIELD OF THE INVENTION

The present invention relates to information privacy over computer networks, and more particularly, enforcing location privacy on a computer network using rights management.

BACKGROUND OF THE INVENTION

In many countries, including the United States, governments have begun mandating that mobile service providers must be able to determine the location of a mobile device with a certain degree of accuracy. For example, some mandates require that mobile service providers must be able to determine the location for a mobile device within a 100-meter radius of the mobile device. While the impetus behind these mandates has been the need to locate a mobile device for emergency services, a byproduct of the ability to determine the location of a mobile device is that the location information may be used by more than just emergency services. In fact, an entire location-based service industry has arisen around the ability to provide location information of a mobile device to so-called location consumers. Location consumers may include the mobile device user, family, friends, business owners, fleet managers, and the like.

Location information can be extremely valuable, hence the rise of the location-based service industry. However, location information can be extremely sensitive in nature. Mobile devices, including, but not limited to, mobile phones, personal digital assistants (PDAs), tablet and notebook computers, as well as many forms of hybrid devices, are usually viewed as personal items, i.e., personal to the mobile device user. As a personal item, a mobile device is usually kept in the personal possession of the mobile device user, and as such, the location of the mobile device closely corresponds to the personal location of the mobile device user. Thus, dissemination of location information is clearly a personal privacy issue. As such, care must be taken to protect the individual's personal location information. Typically, a mobile device user protects his privacy by establishing distribution controls over location information of his mobile device.

Clearly, location information, as personal information, can be used for nefarious or unauthorized purposes. Unfortunately, even when distribution controls are set in place with regard to location information, those that would make unauthorized use of location information are often able to bypass those controls and obtain the location information. For example, while a location-based service provider may impose strict distribution controls in regard to which location consumers may gain access to location information of a mobile device, a rogue administrator with super-user privileges could use those privileges to illegitimately access location information as it passes through the location-based service provider's facilities, easily compromising any distribution controls set in place. Alternatively, one who is eavesdropping on network communications between a location-based service provider and a legitimate location consumer may gain unauthorized access to the location information, again compromising the mobile device user's privacy.

While one of the services of a location-based service provider is to route location information from a mobile service provider to a location consumer, depending on the type of service requested, location-based service providers do not always need the actual location information related to a mobile device. In fact, as described above, the location-based service provider often represents a security weakness as location information passes from a mobile service provider to the location consumer. Accordingly, what is needed is a system and method for securely delivering location information from a mobile service provider to a location consumer in a secure manner. The present invention addresses these and other issues found in the prior art.

SUMMARY OF THE INVENTION

In accordance with aspects of the present invention, a location information server for securely supplying location information of a mobile device to a location consumer, is presented. The location information server includes a processor and a memory. The memory stores instructions which, when executed by the location information server, and in response to a location request from a location consumer, cause the location information server to validate whether the location request is authorized by the mobile device user. If the location request is authorized by the mobile device user, the location information server obtains the location information of the mobile device; generates a location response that includes the location information; and returns the location response to the location consumer.

In accordance with other aspects of the present invention, a computer networked system for securely delivering location information regarding a mobile device from a mobile service provider to a location consumer, is presented. The system includes a location-based service provider. The location-based service provider is communicatively coupled to at least one mobile service provider, and also communicatively coupled to a location consumer. The system also includes a mobile service provider that provides communication services to the mobile device through a mobile service infrastructure, and that also includes a location information server that responds to location requests from the location consumer. The location information server is configured, such that upon receiving a location request, the location information server validates whether the location request is authorized by the mobile device user. If the location request is authorized by the mobile device user, the location information server obtains the location information regarding the mobile device, generates a location response that includes the location information, and returns the location response to the location consumer.

In accordance with yet additional aspects of the present invention, a method for securely delivering location information of a mobile device to a location consumer is presented. The method is executed by a location information server. Upon receiving a location request from the location consumer, the location request is validated to determine whether the location request is authorized by the mobile device user. If the location request is authorized by the mobile device user, the location information server obtains location information of the mobile device; generates a location response that includes the location information; and returns the location response to the location consumer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
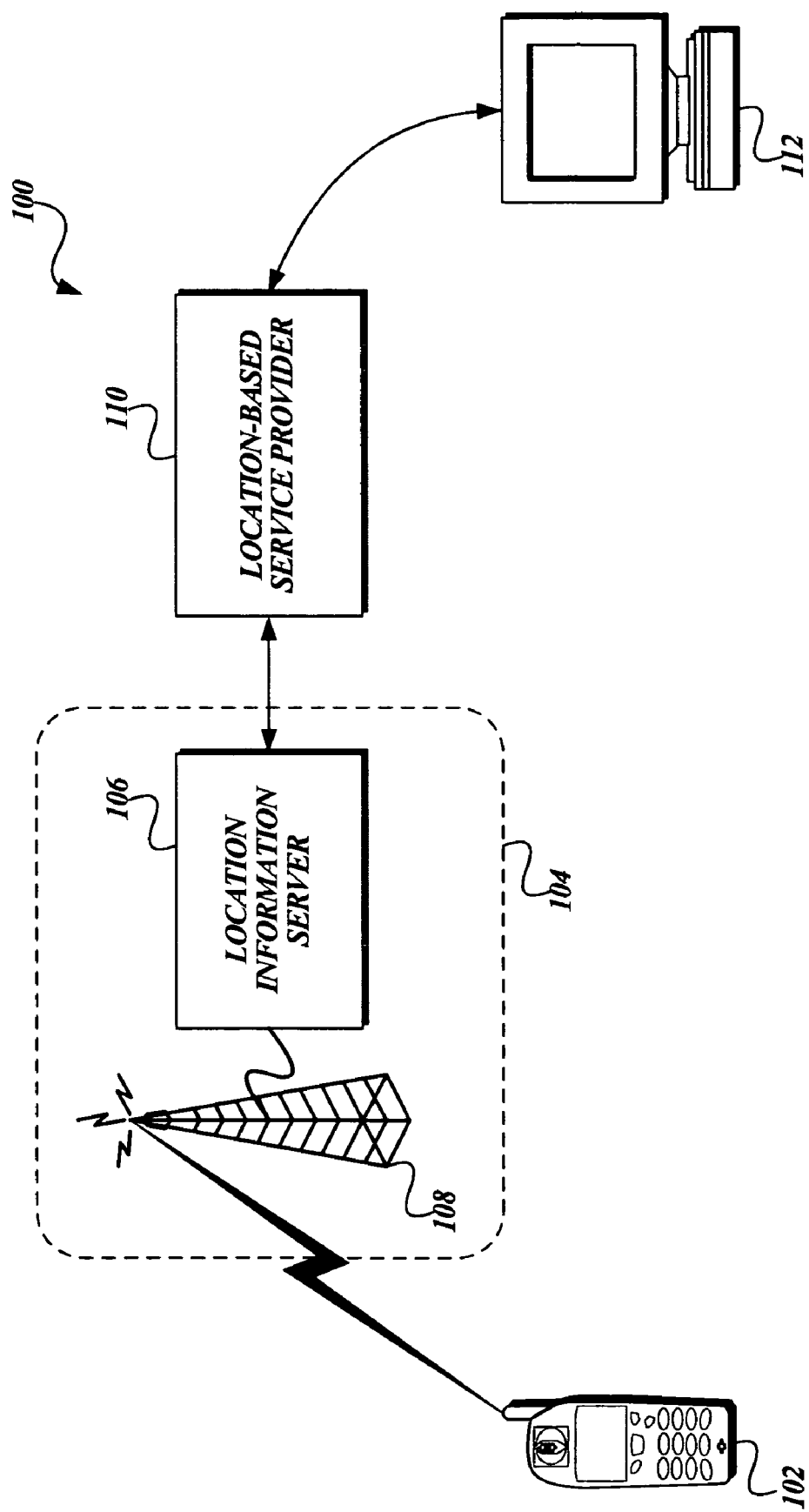
FIG. 1 is a pictorial diagram illustrating an exemplary operating environment suitable for implementing the present invention.

FIG. 1 is a pictorial diagram illustrating an exemplary operating environment 100 suitable for securely delivering location information regarding a mobile device 102 to a location consumer 112. Included in this exemplary environment 100 is a mobile service provider 104. As illustrated in FIG. 1, the mobile service provider 104 includes a mobile service infrastructure 108 and a location information server 106. The mobile service infrastructure 108 corresponds to that infrastructure used by the mobile service provider 104 to provide the mobile service to the mobile device 102, such as cell towers, switches, and the like, and is well known in the art. Additionally, in one embodiment, the mobile service infrastructure 108 may include the hardware and/or software necessary to determine the location of the mobile device 102. The location information server 106 serves as the mobile service provider's external interface for providing location information in response to location requests. The location information server 106 is described in greater detail below in regard to FIG. 3.

Also illustrated in FIG. 1 is a location-based service provider 110. While illustrated in FIG. 1 as connected to just one mobile service provider 104, typically the location-based service provider 110 is connected to various mobile service providers (not shown). Thus, the location-based service provider 110 receives location requests from a location consumer, such as location consumer 112, determines to which mobile service provider the location request is directed (typically based on the target/mobile device of the location request or alternatively, based on the identity of the mobile device user), forwards the location request to the appropriate mobile service provider 104, receives the location information response from the mobile service provider 104, and returns the location information response back to the requesting location consumer 112.

It should be noted that while the FIG. 1, and the present discussion of FIG. 1, illustrate the mobile service provider 104 as a cellular telephone service, it should be viewed as illustrative only, and should not be construed as limiting upon the present invention. In alternative embodiments, the mobile service provider 104 may be replaced with another type of location provider or omitted entirely. For example, the mobile service provider 104 may be replaced by a location server that receives periodic updates from the mobile device via an IP network, such as over one of the IEEE 802.11 or Bluetooth wireless networks. As an alternative, the functionality of the mobile service provider may be implemented in each mobile device in a peer-to-peer environment, and location information is disseminated by each mobile device acting as a location provider. Nevertheless, for descriptive purposes only, while the present invention could use any particular form of location provider, the subsequent description will be made in regards to the mobile service provider 104 as illustrated in FIG. 1.

While the location-based service provider 110 is illustrated in FIG. 1 as being a separate entity from the mobile service provider 104, in an alternative embodiment, the mobile service provider 104, typically via the location information server 106, provides location-based services directly to the location consumers, such as location consumer 112. In other words, the mobile service provider 104 may provide its own location-based services to external clients, thus a separate location-based service provider 110 is not a necessary element of the present invention.

In accordance with aspects of the present invention, to securely deliver location information from the mobile service provider 104 to the location consumer 112, certain controls are enforced by the mobile service provider. In particular, the mobile service provider 104 ensures that only authorized location consumers can obtain location information regarding the mobile device 102. In addition to ensuring that only authorized location consumers can gain access to location information, the mobile service provider 104 also ensures that each location request conforms to conditions specified by the mobile device user. Still further, after validating that the requesting location consumer 112 is an authorized location consumer, and that the location request from the authorized location consumer conforms to any conditions specified by the mobile device user, the location information server prepares a location information response and encrypts the location information in the response (or alternatively, the entire location information response), and returns the encrypted information to the requesting location consumer, typically via the location-based service provider. By encrypting the actual location information in the location information response using a sufficiently strong encryption technology, only those, i.e., the requesting location consumer 112, who have the decryption key will be able to truly gain access to the location information.

Figure 2:
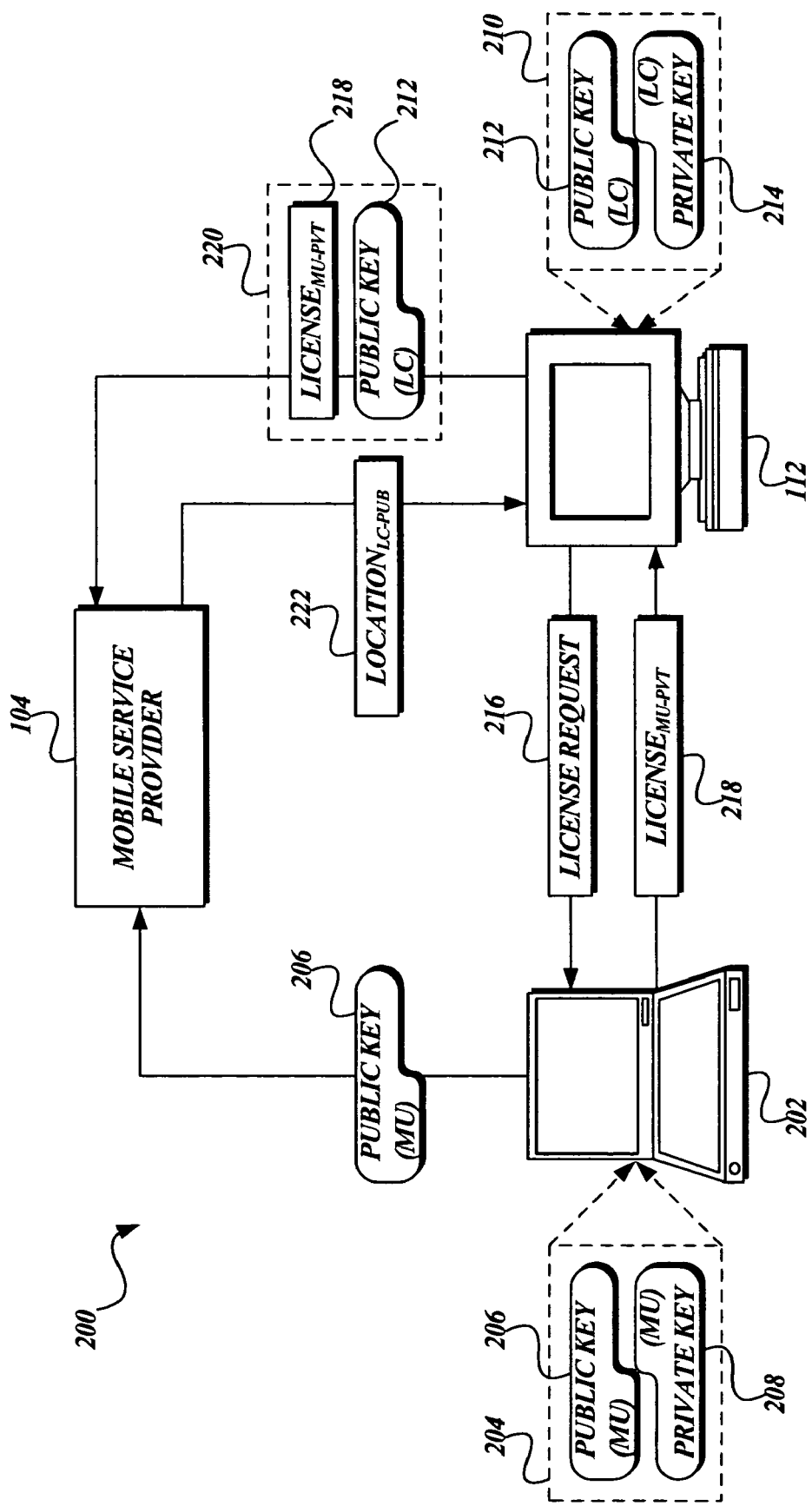
FIG. 2 is a pictorial diagram for illustrating the initialization and operation aspects of the present invention.

In order for the mobile service provider 104 to enforce the above-described controls when a location request is received according to the present invention, some prior initializations and exchanges must have occurred. FIG. 2 is a pictorial diagram 200 for illustrating various initialization and exchange between components of the exemplary operating environment 100. The pictorial diagram 200 includes the mobile service provider 104 and the location consumer 112. However, in order to simplify the discussion of initialization and exchange, the location-based service provider 110 is not illustrated in FIG. 2. Nevertheless, while the present invention secures location information while at the location-based service provider 110, the absence of the location-based service provider in FIG. 2 may serve to illustrate that the services provided by the location-based service provider may be incorporated into the mobile service provider 104, or alternatively, may be incorporated into the location consumer 112.

In order for the mobile service provider 104 to validate that only authorized location consumers gain access to location information, the mobile service provider must be able to identify the authorized location consumers from the unauthorized location consumers. Rather than providing the mobile service provider 104 a list of authorized consumers, which must invariably be constantly updated, according to the present invention, the mobile device user issues a license to a location consumer, such as location consumer 112. Through a valid license, the mobile service provider 104 is able to identify an authorized location consumer from an unauthorized location consumer. According to aspects of the present invention, this license can only be issued by the mobile device user, uniquely identifies the location consumer, and cannot be altered without destroying the validity of the license. Additionally, as will be described in greater detail below, the license includes any conditions that the mobile device user places on the access or use of the location information.

The present invention uses various encryption technologies to secure a license against forgery. In particular, when a location consumer 112 requests a license from the mobile device user, the mobile device user, typically via a computing device, encrypts all or some of the information in, or related to, the license. The mobile service provider 104 uses a decryption key to decrypt the encrypted information in the license (which accompanies the location request from the location consumer 112) to determine if the location consumer is authorized. If the information decrypts appropriately, and corresponds to the requesting location consumer, then the mobile service provider 104 determines that the license is thus far valid and the location consumer 112 is thus far authorized to access the location information.

While many encryption technologies may be used, the present invention preferably uses digital signature techniques that include a public key/private key pair, sometimes referred to a asymmetric keys, to encrypt and decrypt license related information. Thus, with reference to FIG. 2, the mobile device user has been issued a encryption key pair 204 for digitally signing electronic information, comprising a public key 206 and a private key 208. Thus, the mobile device user digitally signs the license issued to the location consumer 112 using the mobile device user's private key 208. Correspondingly, the mobile service provider 104 verifies that a digitally signed license obtained from a location consumer 112 is valid, using the mobile device user's public key 206. Digital certificates and authentication using digital certificates are well known in the art. Briefly stated however, the mobile device user digitally signs the license by executing a secure hash on all or some of the license, and encrypts the results of the hash with the mobile device user's private key 208. To validate that the information (license) is valid, the mobile service provider 104 also executes the same hash on the license, decrypts the encrypted hash results using the mobile device user's public key 206, and compares the hash results. If they match, then the license is valid. Alternatively, if they do not match, then the license or encrypted hash results have been tampered with.

It should be noted that while FIG. 2 illustrates a mobile device user's computer 202, in fact the mobile device user's computer may be the mobile device 102. For example, a mobile device 102 may be a hybrid communication device/computing device with the ability to generate licenses in response to a license request.

As part of the initialization that must take place, the mobile device user delivers the mobile device user's public key 206 to the mobile service provider. Those skilled in the art will recognize that delivery should be performed in a trusted manner, i.e., one in which the mobile service provider 104 can be confident that it is obtaining the mobile device user's public key 206 from the mobile device user. Once the mobile service provider 104 has the mobile device user's public key 206, the mobile service provider is able to validate licenses that are created using the mobile device user's private key 208.

With regard to FIG. 2 and its description, a label that includes a subscript implies that that item has been encrypted, or digitally signed, and identifies the originator of the encryption/signature as well as the key by which it is encrypted/digitally signed. For example, the label for license 218 reads "LICENSE$_{MU-PVT}$". This means that the license 218 has been digitally signed by the mobile device user (MU) using the mobile device user's private key (PVT). Similarly, the label for the location response 222 reads "LOCATION$_{LC-PUB}$" which means the location response is encrypted using the location consumer's (LC) public key (PUB).

As part of the initialization of the present invention, the location consumer is also issued an encryption key pair 210, comprising a public key 212 and a private key 214. This encryption key pair 210 is used to ensure that location information about the mobile device 102 is secured as it is transferred from the mobile service provider 104 to the location consumer 112.

On occasion, the location consumer 112 itself represents a security risk to securing the location information of the mobile device 102. For example, a location consumer 112 could distribute location information of the mobile device 102 after having received and decrypted it. Furthermore, with typical public key/private key pairs, such as key pair 210, the protected information is only secure so long as the location consumer 112 keeps its private key 214 private. Once another person is in possession of the location consumer's private key 214, information protected using the location consumer's public key 212 may be accessed.

According to one embodiment of the present invention, in order to further ensure that location information made available to the location consumer 112 stays with the location consumer, the location consumer must have a digital rights management lock-box installed. Digital rights management lock-boxes, also referred to as digital rights management black-boxes, are generally described in U.S. Provisional Patent Application No. 60/126,614, filed Mar. 27, 1999, entitled *Enforcement Architecture and Method for Digital Rights Management*, which is incorporated herein by reference.

Generally speaking, a digital rights management lock-box (hereafter "lock-box"), is installed on the location consumer's computer 112 via an activation process using a trusted digital rights management activation service. This activation process authenticates the identity of the location consumer 112, and once authenticated, installs a lock-box onto the computer. This lock-box is both unique to the location consumer (user) and the location consumer's computer 112. In other words, the lock-box cannot be transferred from one computer to another. Additionally, the activation process provides the location consumer 112 with an encryption key pair 210, including both a public key 212 and a private key 214. To ensure that they private key 214 remains private, the private key is securely embedded in the lock-box. As such, the user (location consumer) does not know or have access to the private key 214. The location consumer 112 must therefore use the lock-box to access information encrypted with the location consumer's public key 212. The activation process also provides an identity certificate to the location consumer. This identity certificate includes an identifier or token that uniquely identifies the location consumer 112, the public key 212, and possibly other information. This identity certificate is digitally signed by the activation service's private key, and can be validated by using the activation service's public key. As is understood by those skilled in the art, the activation service's public key may be widely published and/or made available through trusted parties.

As shown in FIG. 2, the location consumer 112 issues a license request 216 to the mobile device user, or more particularly, to the mobile device user's computer 202. This is typically accomplished over a network using a network protocol, such as TCP/IP. After receiving the license request 216, the mobile device user is free to issue a license, or deny the license request. Preferably, the license request 216 positively identifies the location consumer, such that the mobile device user can be confident that the license is issued to a trusted location consumer. In one embodiment, when the location consumer 112 is installed with a lock-box, the license request 216 is accompanied by or includes the identity certificate for the location consumer 112, thereby positively identifying the location consumer to the mobile device user. The mobile device user can use the activation service's public key to validate the identity certificate for the location consumer 112.

The license request 216 also contains the location consumer's public key 212. In one embodiment, when the location consumer 112 is installed with a lock-box, the public key 212 is contained in the identity certificate that accompanies the license request 216.

If the mobile device user decides to issue a license to the location consumer 112, the mobile device user may also specify, in the license, any conditions on the use of location information. Conditions of use include, but are not limited to, the number of times the license may be used to access location information; the times of day that the license may be used; the days of the week that the license may be used; a block of time (days, hours, etc.) that the license is valid; that location information may be accessed only if the location corresponds to a particular region or area; the accuracy/specificity of location information, i.e., that the accuracy be diluted before returning it to the location consumer; the applications or types of applications that may use the location information; and whether the information may be distributed beyond the location consumer. In addition to access and use conditions, the license will also include, but is not limited to, an identifier that uniquely identifies the location consumer, such as an identifier/token that uniquely identifies the location consumer, the identity certificate discussed above, or the public key 212, to whom the license will be issued, and a validity time period identifying the time period during which the license is valid. The license will also include an identifier/token that uniquely identifies the mobile device user. This identifier can be the mobile device user's account number, phone number, or some other unique identifier.

After determining the terms of the license, the mobile device user, or more specifically, the mobile device user's computer 202 digitally signs the information using the mobile device user's private key 208. The result is the completed license 218 (hereafter "license"). It should be noted that, for simplicity in description, while the present discussion is directed at a single license from the mobile device user, in fact a mobile device user, via the computer 202, may issue more than one license in response to a license request 216.

The license 218 is generated such that it uniquely authorizes the location consumer 112 to access location information for the mobile device 102 according to the conditions included in the license. Additionally, the license 218 is digitally signed such that any modification will render the license invalid. Thus, a license cannot be surreptitiously modified to permit another location consumer to access the location information.

As those skilled in the art will appreciate, using public key/private key technology, information encrypted with a private key can only be decrypted using the corresponding public key. Similarly, information encrypted with a public key can only be decrypted using the corresponding private key. Hence, by delivering the mobile device user's public key 206, the mobile device user enables the mobile service provider 104 to validate that the license 218 is an authentic license issued to the location consumer 112.

It should be noted that while the present invention preferably uses digital signatures, to secure the license 218, it is not a necessary element. What is required is that the mobile service provider 104 be able to somehow identify a license, such as license 218, as authentically issued to a location consumer 112.

With a validly issued license 218, the location consumer 112 can issue a location request 220 to the mobile service provider 104, either directly or indirectly through a location-based service provider 110 (FIG. 1). The location request 220 typically includes the license 218, and may include additional information. In one embodiment, where the location consumer 112 is installed with a lock-box and the license 218 contains an identifier/token identifying the location consumer, but does not contain the consumer's identity certificate, rather the location request is accompanied by the location consumer's identity certificate.

As mentioned above, while the present discussion describes the exchange of just one license 218, a mobile device user may issue multiple licenses to the location consumer 112. Similarly, while the present discussion describes that the location consumer 112 submits a single license to the mobile service provider 104, in an alternative embodiment, the location consumer may submit the plurality of license obtained form the mobile device user in the location request 220. When receiving multiple licenses from a location consumer 112, it is left up to the mobile service provider 104 to select the license that is most appropriate.

Generally speaking, upon receiving the location request 220, the mobile service provider 104 first determines if the location request 220 is valid. To this end, the mobile service provider 104 verifies that the license 218 is valid using the mobile device user's public key 206, and validating that the license was issued to the location consumer 112 using the location consumer's public key 212 (and identify certificate if included.) As will be discussed below, other processing may also occur to determine that the location consumer may obtain location information regarding the mobile device 102.

After validating that the location request 220 is a valid request, the mobile service provider 104 obtains the location information of the mobile device 102 (FIG. 1), performs any processing specified in the conditions of the license 218, encrypts the location information using the location consumer's public key 212, and returns a location information response 222 to the location consumer 112, either directly or indirectly through the location-based service provider 110 (FIG. 1).

In one embodiment (not shown), when the location consumer 112 is installed with a lock-box, the mobile service provider 104 indirectly encrypts the location response with the location consumer's public key 212. In this case, the mobile service provider 104 encrypts the location information with a symmetric encryption key, i.e., a key which is used to both encrypt and decrypt the location information. This symmetric key is then encrypted with location consumer's public key 212. In this manner, the location information is only "indirectly" encrypted with the location consumer's public key 212. If the location information, rather than the symmetric key, is encrypted using the location consumer's public key 212, then the location information is directly encrypted with the public key 212. The net result of encrypting the location information, and symmetric key if used, is that the mobile service provider 104 generates a location-consumption license that enables the location consumer's lock-box to decrypt the encrypted location response.

By encrypting the location information, directly or indirectly, using the location consumer's public key 212, only someone with the location consumer's corresponding private key 214 is able to decrypt the location information. If this information is embedded in a lock-box, only the location consumer can access the location information. In one embodiment, and similar to the license issued to the location consumer, the location response 222 is encrypted such that any modification, such as altering use conditions placed on the location information, renders the location response unusable, including the location information. Thus, the location information is securely delivered to the location consumer 112, even over networks and/or infrastructures where unauthorized individuals may gain access to the location response.

In one embodiment, the location-consumption license may contain additional restrictions on the usage of the location information. These restrictions include, but are not limited to, the number of times the license can be used to decrypt the location information, the time period in which the license can be used, and the applications that can use (or can not use) the information accessible through the license.

Figure 3:
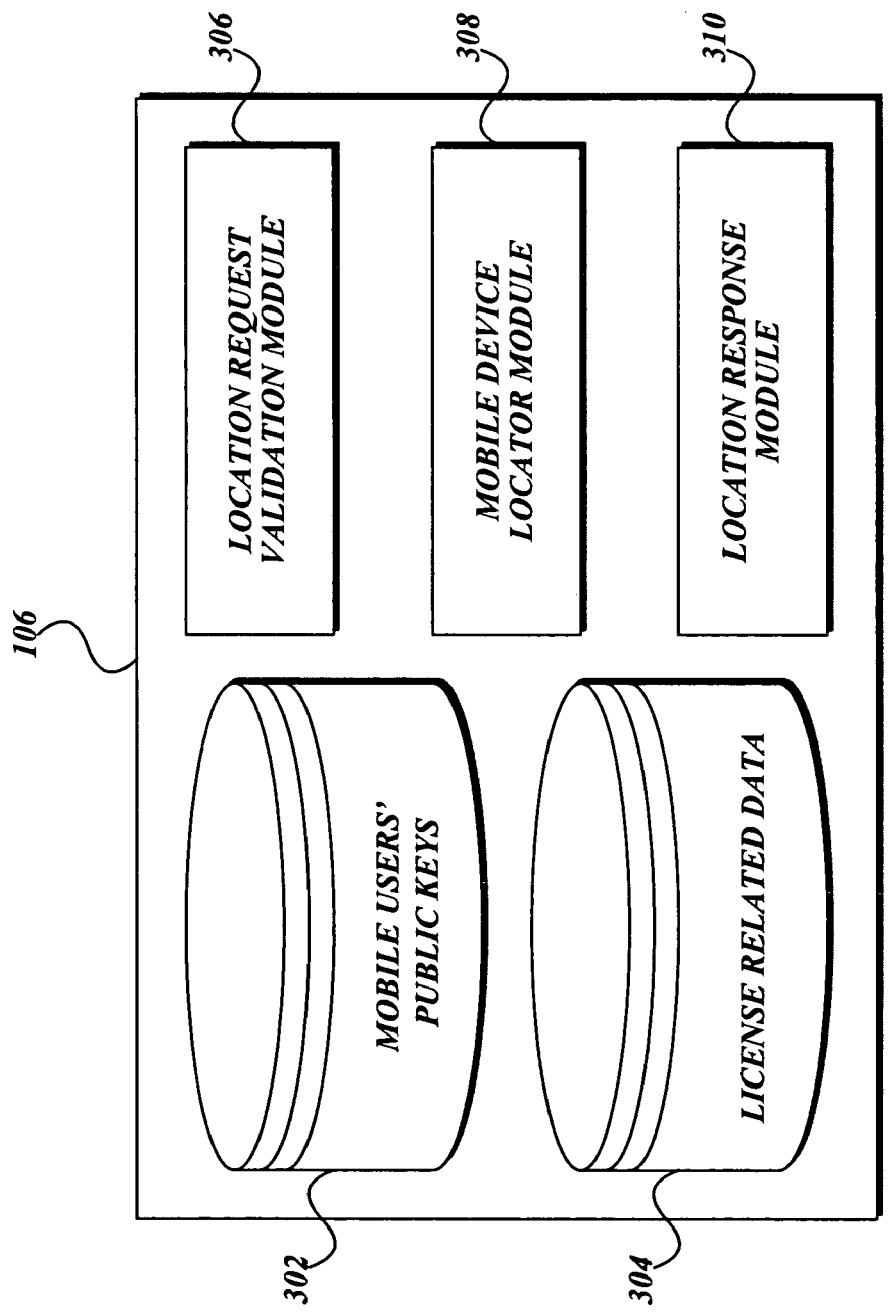
FIG. 3 is a block diagram illustrating exemplary components of a mobile service provider server suitable for implementing aspects of the present invention.

As mentioned above, the mobile service provider 104 includes the mobile service provider infrastructure 108 that provides the mobile service to the mobile device 102, as well as a location information server 106 for processing the location requests as described above. FIG. 3 is a block diagram illustrating exemplary components of a location information server 106 suitable for implementing aspects of the present invention.

While not illustrated in FIG. 3, according to one embodiment of the present invention, the location information server 106 is a computer that includes a processor and a memory, where the memory stores executable instructions for carrying out the functions described in regard to the location information server. Those skilled in the art will readily appreciate that the location information server 106 may be implemented on numerous types of computers, including, but not limited to, personal computers and mini- and mainframe computers. In addition to implementing a location information server 106 on a single machine, according to alternative aspects of the present invention, components of the location information server may be implemented on a distributed network of cooperating computers, where each cooperating computer includes one or more processors.

As mentioned above, mobile device users submit their public keys to the mobile service provider 104 so that the mobile service provider is able to validate the license 218 included as part of a location request 220. Accordingly, the location information server 106 includes a public key store 302 for storing the public keys of the mobile device users.

The location information server 106 also includes a location request validation module 306. The location request validation module 306 receives location requests, such as location request 220 (FIG. 2) from location consumers, such as location consumer 112, either directly from the location consumers or indirectly through a location-based service provider 110. The location request validation module 306 then validates whether each location request 220 is one that should be honored by the mobile service provider 104.

Validating whether a location request 220 from a location consumer 112 is authorized includes multiple aspects. Initially, the location request validation module 306 determines whether the location request 220 includes a valid license 218 issued to the location consumer 112. As mentioned above, to do so, the location request validation module 306 validates the license 218 using the mobile device user's public key 206 that is stored in the public key store 302. In those embodiments where the location consumer's identity certificate is not included in the license 218 but is sent separately in the location request 220, the validation module verifies that the location consumer's identity certificate is authentic and valid, and also verifies that the identity token contained in the identity certificate is the same as the location consumer's identity token contained in the license 218.

In addition to determining the validity of the license 218, and assuming the license is validly issued to the location consumer, the location request validation module 306 further validates that the location request conforms to the conditions specified in the license. For example, if a time of day range is specified as a condition, the location request validation module 306 determines whether the location request falls within a permissible time period.

Because some conditions require that license-related information be kept, the location information server 106 also includes a license-related data store 304. The license-related data store 304 stores the license-related data that is related to, but for some reason is not included in the license. For example, a condition established in a license 218 may state that the location consumer 112 may only access location information regarding the mobile device ten times, or ten times within a twenty-four hour period. In order to keep track of the number of times that license has been used, a counter must be kept. This license-related counter is stored in the license-related data store 304.

Another aspect of validating a location request 220 is determining if the license 218 supporting the location request has been suspended and/or revoked. For example, after the mobile device user issues a license 218 to the location consumer 112, the mobile device user may, for a myriad of reasons, have second thoughts regarding permitting the location consumer to access the location information and wish to revoke or suspend the license. Clearly, it may be entirely impossible, if not impractical, to retrieve a license 218 issued to the location consumer 112. Thus, according to aspects of the present invention, the mobile device user may submit a revocation or suspension notice to the mobile service provider 104. This information is then stored in the license-related data store 304. Subsequently, as part of validating whether a location request 220 should be honored, the location request validation module 306 also determines whether the license 218, upon which the location request is authorized, is suspended or has been revoked. If either case is true, the location request is not honored.

Only after the location request validation module 306 has validated that the location request is authentic and issued to the location consumer 112, that the location request conforms to the conditions of the license, and that the location request is neither suspended or revoked, is the location information of the mobile device 102 obtained. The location of the mobile device 102 is obtained by the location information service 106 using a mobile device locator module 308. In one embodiment, the mobile device locator module 308 operates with the mobile service provider infrastructure 108 to obtain the location of the mobile device 102. Obtaining location information may mean obtaining the location information after the mobile service provider infrastructure 108 determines the location of the mobile device. Alternatively, obtaining location information may mean querying the mobile device for its location, especially for those location-aware mobile devices, i.e., those that are able to determine their own location.

After obtaining the location information, the location information server 106 generates a location response 222 via a location response module 310. The location response module 310 is responsible for processing the location information of the mobile device 102 according to any conditions specified in the license 218, directly/indirectly encrypting the location information using the location consumer's public key, and returning the information as the location response 222 to the location consumer 112. As mentioned above, processing the location information may include, but not be limited to, diluting the specificity of the location information, identifying geographic regions or areas in which the mobile device is located, specifying which applications or types of applications may use the location information, and the like. Furthermore, by encrypting the location information using the location consumer's public key 212, only one in possession of the corresponding private key 214 is able to decrypt the location information.

Figure 4:
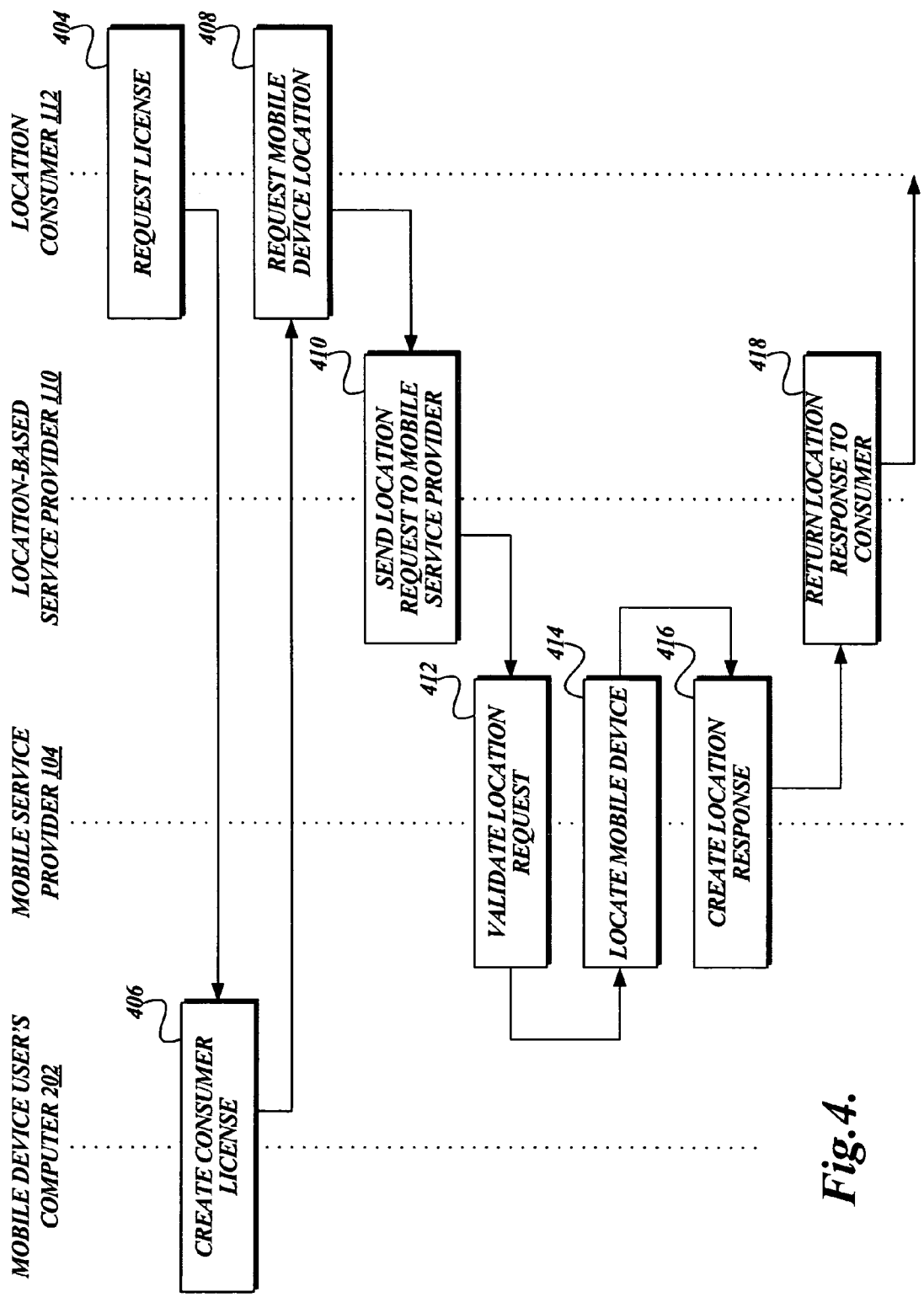
FIG. 4 is a block diagram illustrating an exemplary exchange among components in the exemplary operating environment for securely delivering location information from a mobile service provider to a location consumer in accordance with the present invention.

In order to more fully illustrate how the above-described components inter-operate, an exemplary exchange will be described. FIG. 4 is a block diagram illustrating an exemplary exchange among the above-described components of the exemplary operating environment 100 for securely delivering location information from a mobile service provider 104 to a location consumer 112, in accordance with the present invention. The exemplary exchange, as illustrated in FIG. 4, occurs among four different entities: the mobile device computer 202, the mobile service provider 104, the location-based service provider 110, and the location consumer 112. Events are represented as boxes under one of the four components. For example, event 404 falls directly under the heading for the location consumer 112. Thus, event 404 corresponds to an action taken by the location consumer 112. Similarly, event 406 falls directly under the mobile device user 202 heading, and thus corresponds to an event or action taken by the mobile device user computer.

Beginning at event 404, the location consumer 112 issues a request for a license to the mobile device user's computer 202. As previously mentioned, the mobile device user's computer 202 may correspond to the mobile device 102, or may be a separate computer operated by the mobile device user for processing license requests. At event 406, after receiving the license request, the mobile device user's computer 202 generates the license 218 for the location consumer 112, and returns the license to the location consumer.

At some point after receiving the license 218, at event 408, the location consumer 112 issues a location request 220 for location information regarding the mobile device 102. As shown in FIG. 4, this location request 220 is sent to the location-based service provider 110. As previously mentioned, the location request 220 includes the license 218 obtained from the mobile device user, as well as the location consumer's public key 212. At event 410, the location-based service provider 110 identifies the mobile service provider 104 corresponding to the mobile device 102, which is the subject of the location request 220, and forwards the location request to that mobile service provider 104.

At event 412, the mobile service provider 104 validates the location request 220 from the location consumer 112. Assuming that the location request 220 is a valid request, i.e., the license 218 is authentic, is not suspended or revoked, and the request conforms to the conditions in the license, at event 414, the mobile service provider obtains the location of the mobile device 102.

At event 416, after having obtained the location of the mobile device 102, the mobile service provider 104 generates the location response 222. As previously discussed, generating the location response 222 may include processing the location information according to the conditions specified in the license 218, including diluting the specificity of the location information, identifying conditions and/or applications as to how the location information may be used, and the like, and then directly/indirectly encrypting the location information using the location consumer's public key 212. The mobile service provider 104 then returns the location response 222 to the location-based service provider 110. At event 418, the location-based service provider 110 forwards the location response 222 to the location consumer 112.

Figure 5:
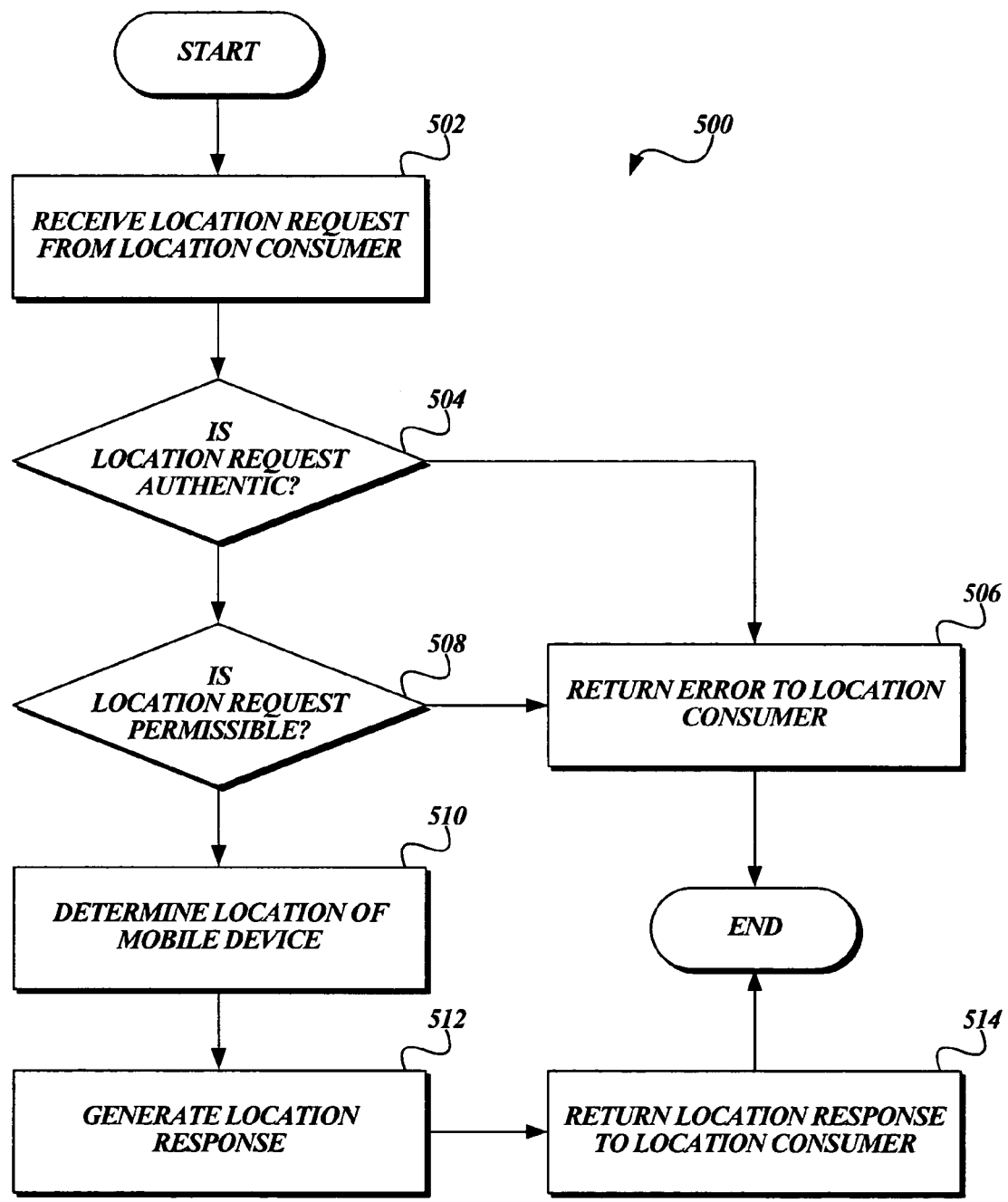
FIG. 5 is a flow diagram illustrating an exemplary routine, executed by a mobile service provider, for responding to a location request from a location consumer.

FIG. 5 is a flow diagram illustrating an exemplary routine 500, executed by mobile service provider 104, for responding to a location request 220 from a location consumer 112. Beginning at block 502, the mobile service provider 104 receives the location request 220 from a location consumer 112. As described above, the location request 220 may be submitted directly to the mobile service provider 104 or, alternatively, submitted indirectly through a location-based service provider 110.

At decision block 504, a determination is made as to whether the location consumer's license is authentic. In other words, the determination is made as to whether the mobile device user generated the license 218 that the basis of the location request 220. If the license is not authentic, at block 506, an error is returned to the location consumer 112, and the routine 500 terminates.

If the license is authentic, i.e., generated by the mobile device user and corresponding to the location consumer 112, at decision block 508, another determination is made as to whether the location request 220 is permissible according to the conditions set forth in the license 218. As previously described, the license sets any number of conditions including a number of times that the location consumer 112 can access the location information, the specificity by which the location consumer may obtain information regarding location device 102, the time of day that the information may be accessed, and the like. Determining whether the location request is permissible also includes determining whether the license 218 has been revoked or is currently suspended. If the location request is not permissible according to the conditions of the license, at block 506, an error is returned to the location consumer 112, and the routine 500 terminates.

If the location request is permissible according to the conditions specified in the license 218, at block 510, the mobile service provider 104 obtains the location of the mobile device 102. As already discussed, obtaining the location of the mobile device 102 may entail actually determining the location of the mobile device using the mobile service provider infrastructure 108 or, alternatively, obtaining the location information from the mobile device.

After obtaining the location information for the mobile device 102, at block 512, the mobile service provider 104 generates the location response 222. As previously mentioned, the location information is processed according to conditions specified in the license 218, as well as encrypting the information using the location consumer's public key 212. After generating the location response 222, at block 514, the mobile service provider 104 returns the location response to the location consumer 112, either through a location-based service provider 110 or directly to the location consumer. Thereafter, the exemplary routine 500 terminates.

Figure 6:
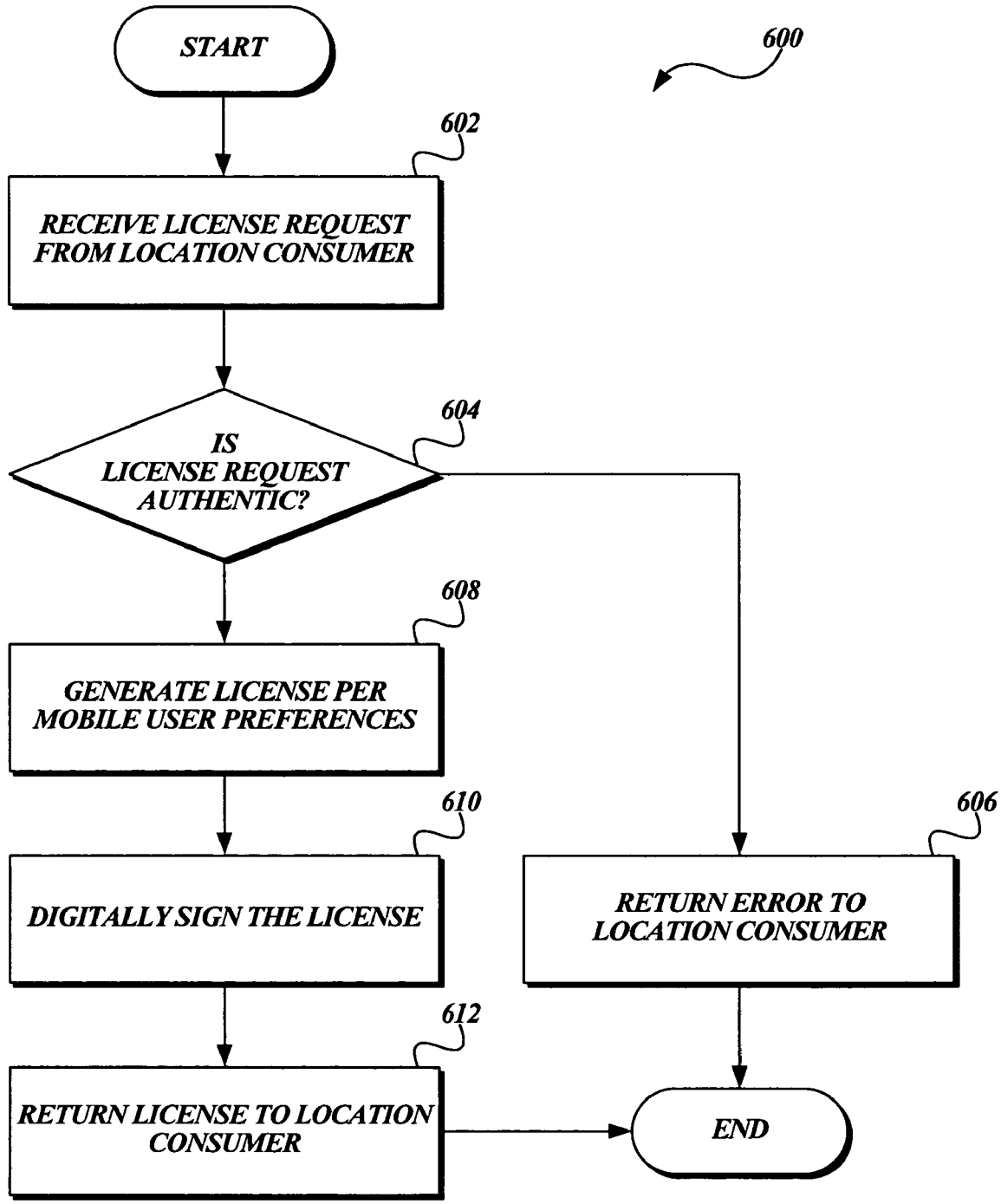
FIG. 6 is a flow diagram of an exemplary routine, executed on a computing device, for responding to a license request from a location consumer.

FIG. 6 is a flow diagram of an exemplary routine 600, executed on a mobile device user's computing device 202, for responding to a license request from a location consumer 112. Beginning at block 602, the mobile device user's computing device receives the license request from the location consumer 112. At decision block 604, the mobile device user, typically via the mobile device user's computing device 202, determines whether the license request is authentic. In other words, the mobile device user validates whether the location consumer 112 is who he represents to be, such as by determining through a trusted source whether the location consumer is who he says he is. If the mobile device user determines that the license request is not authentic, at block 606, an error is returned to the location consumer 112, and the routine 600 terminates.

Alternatively, if the license request is authentic, at block 608, the mobile device user generates a license 218 per the mobile device user's preferences. As described above, it is at this point that the mobile device user includes the conditions upon which the location consumer 112 may access the location information of the mobile device 102. After having established the license and conditions according to mobile device user's preferences, at block 610, the mobile device user digitally signs the license 218 by using the mobile device user's private key 208. At block 612, the license 218 is then returned to the location consumer 112, and the routine 600 terminates.

While various embodiments of the invention have been illustrated and described, including the preferred embodiment, it will be appreciated that various changes can be made therein without departing from the spirit and scope of the invention.

The embodiments of the invention in which an exclusive property or privilege is claimed are defined as follows:

1. A location information server configured to securely deliver location information of a mobile device to a location consumer, the location information server comprising:
   a processor; and
   a memory storing executable instructions which, when executed by the location information server, and in response to receiving a location request, cause the location information server to:
   validate that the location request is authorized by the mobile device user, the location request including a license, wherein the license includes access conditions that identify conditions upon which the location consumer is authorized to access the location information of the mobile device, the access conditions comprising conditions of use based on at least one of the following:
      a number of usages for which the license is valid,
      at least one location for which the license is valid, and
      at least one application for which the license is valid; and
   determine whether the license is valid, wherein determining whether the license is valid comprises:
      verifying validity of a public key associated with the mobile device,
      verifying validity of a identity certificate associated with the location consumer,
      verifying validity of the access conditions associated with the license, and
      determining if the license if one of: suspended and expired; and
   obtain the location information of the mobile device if the location request is authorized by the mobile device user;
   generate a location response, including the location information, if the location request is authorized by the mobile device user, wherein generating the location response comprises:
      diluting specificity of the location information,
      identifying one of: geographic regions and areas in which the mobile device is located,
      specifying which applications may use the location information, encrypting the location information in the location response; and
      return the location response to the location consumer.

2. The location information server of claim 1, wherein validating that the location request is authorized by the mobile device user comprises validating that the license was issued by the mobile device user.

3. The location information server of claim 2 further comprising a key store, and wherein validating that the license was issued by the mobile device user comprises:
   decrypting encrypted information in the license using a decryption key associated with the mobile device user stored in the key store; and
   validating that the resulting decrypted information indicates that the license was issued by the mobile device user.

4. The location information server of claim 3, wherein the decryption key associated with the mobile device user stored in the key store is the mobile device user's public key, and the encrypted information in the license was encrypted using a mobile device user's corresponding private key, such that data encrypted with the mobile device user's private key can only be validly decrypted by the mobile device user's corresponding public key.

5. The location information server of claim 4, wherein validating that the resulting decrypted information indicates that the license was issued by the mobile device user comprises determining whether the encrypted information is properly decrypted by the mobile device user's public key.

6. The location information server of claim 5, wherein the location request further includes a location consumer identifier that uniquely identifies the location consumer issuing the location request;
   wherein the resulting decrypted information includes a location consumer identifier uniquely identifying the location consumer to whom the license is issued; and
   wherein validating that the location request is authorized by the mobile device user further comprises determining whether the location consumer identifier in the location request corresponds to the location consumer identifier in the decrypted information.

7. The location information server of claim 2 further comprising a license-related information store that stores license-related information for validating that the location request is authorized by the mobile device user.

8. The location information server of claim 7, wherein the license-related information store stores revocation information identifying licenses that have been revoked by the mobile device user, and wherein validating that the location request is authorized by the mobile device user comprises determining whether the license has been revoked according to the revocation information in the license-related information store.

9. The location information server of claim 7, wherein license-related information store stores suspension information identifying licenses that are currently suspended by the mobile device user, and wherein validating that the location request is authorized by the mobile device user comprises determining whether the license is currently suspended according to the suspension information in the license-related information store.

10. The location information server of claim 7, wherein validating that the location request is authorized by the mobile device user comprises evaluating the access conditions to validate that the location request is authorized by the mobile device user.

11. The location information server of claim 10, wherein the license-related information store stores access condition information for enforcing the access conditions identified in the license.

12. The location information server of claim 2, wherein generating the location response comprises encrypting at least some of the location response, including the location information, using an encryption key associated with the location consumer.

13. The location information server of claim 12, wherein the location request further includes the location consumer's encryption key.

14. The location information server of claim 13, wherein the location consumer's encryption key is the location consumer's public key, such that the encrypted portion of the location response can only be validly decrypted by the location consumer's corresponding private key.

15. The location information server of claim 12, wherein the license identifies use conditions for controlling how the location consumer may use the location information, and wherein generating the location response further comprises including the identified use conditions in the location response.

16. The location information server of claim 15, wherein the license further identifies precision conditions for specifying the precision of the location information returned to the location consumer, and wherein generating the location response further comprises processing the location information according to the precision conditions.

17. The location information server of claim 12, wherein the location response is generated in such a manner as to render the included location information unusable if it is altered.

18. The location information server of claim 2, wherein the license is issued by the mobile device user such that any modification to the license invalidates the license.

19. A computer networked system configured to securely deliver location information regarding a mobile device from a mobile service provider to a location consumer, the system comprising:
  a location-based service provider communicatively coupled to at least one mobile service provider, and also communicatively coupled to a location consumer; and
  a mobile service provider that provides communication services to the mobile device through a mobile service infrastructure, and that includes a location information server configured such that, in response to receiving a location request from a location consumer, the location information server:
    validates that the location request is authorized by the mobile device user, the location request including a license, wherein the license includes access conditions that identify conditions upon which the location consumer is authorized to access the location information of the mobile device, the access conditions comprising conditions of use based on at least one of the following:
      a number of usages for which the license is valid,
      at least one location for which the license is valid, and
      at least one application for which the license is valid; and
    determines whether the license is valid, wherein determining whether the license is valid comprises:
      verifying validity of a public key associated with the mobile device,
      verifying validity of a identity certificate associated with the location consumer,
      verifying validity of the access conditions associated with the license, and
      determining if the license if one of: suspended and expired; and
    obtains the location information regarding the mobile device if the location request is authorized by the mobile device user;
    generates a location response if the location request is authorized by the mobile device user, the location response including the location information, wherein generating the location response comprises:
      diluting specificity of the location information,
      identifying one of: geographic regions and areas in which the mobile device is located,
      specifying which applications may use the location information, encrypting the location information in the location response; and
    returns the location response to the location consumer.

20. The computer networked system of claim 19, wherein the location information server receives the location request from the location-based service provider, and wherein the location information server returns the location response to the location consumer through the location-based service provider.

21. The computer networked system of claim 20, wherein the location-based service provider, upon receiving a location request from a location consumer, is configured to identify the mobile service provider servicing the mobile device targeted by the location request, and forward the location request to the identified mobile service provider's location information server.

22. The computer networked system of claim 21, wherein validating that the location request is authorized by the mobile device user comprises validating that the license was issued by the mobile device user.

23. The computer networked system of claim 22, wherein the location information server comprises a key store, and wherein validating that the license was issued by the mobile device user comprises:
  decrypting encrypted information in the license using a decryption key associated with the mobile device user stored in the key store; and
  validating that the resulting decrypted information indicates that the license was issued by the mobile device user.

24. The computer networked system of claim 23, wherein the decryption key associated with the mobile device user stored in the key store is the mobile device user's public key, and the encrypted information in the license was encrypted using a mobile device user's corresponding private key, such that data encrypted with the mobile device's device user key can only be validly decrypted by the mobile device user's corresponding public key.

25. The computer networked system of claim 24, wherein validating that the resulting decrypted information indicates that the license was issued by the mobile device user comprises determining whether the encrypted information is properly decrypted by the mobile device user's public key.

26. The computer networked system of claim 25, wherein the location request further includes a location consumer identifier that uniquely identifies the location consumer issuing the location request;

wherein the resulting decrypted information includes a location consumer identifier uniquely identifying the location consumer to whom the license is issued; and wherein validating that the location request is authorized by the mobile device user further comprises determining whether the location consumer identifier in the location request corresponds to the location consumer identifier in the decrypted information.

27. The computer networked system of claim 22, wherein the location information server further comprises a license-related information store that stores license-related information for validating that the location request is authorized by the mobile device user.

28. The computer networked system of claim 27, wherein the license-related information store stores revocation information identifying licenses that have been revoked by the mobile device user, and wherein validating that the location request is authorized by the mobile device user comprises determining whether the license has been revoked according to the revocation information in the license-related information store.

29. The computer networked system of claim 27, wherein license-related information store stores suspension information identifying licenses that are currently suspended by the mobile device user, and wherein validating that the location request is authorized by the mobile device user comprises determining whether the license is currently suspended according to the suspension information in the license-related information store.

30. The computer networked system of claim 27 wherein validating that the location request is authorized by the mobile device user comprises evaluating the access conditions to validate that the location request is authorized by the mobile device user.

31. The computer networked system of claim 30, wherein the license-related information store stores access condition information for enforcing the access conditions identified in the license.

32. The computer networked system of claim 22, wherein generating the location response comprises encrypting at least some of the location response, including the location information, using an encryption key associated with the location consumer.

33. The computer networked system of claim 32, wherein the location request further includes the location consumer's encryption key.

34. The computer networked system of claim 33, wherein the location consumer's encryption key is the location consumer's public key, such that the encrypted portion of the location response can only be validly decrypted by the location consumer's corresponding private key.

35. The computer networked system of claim 32, wherein the license identifies use conditions for controlling how the location consumer may use the location information, and wherein generating the location response further comprises including the identified use conditions in the location response.

36. The computer networked system of claim 35, wherein the license further identifies precision conditions for specifying the precision of the location information returned to the location consumer, and wherein generating the location response further comprises processing the location information according to the precision conditions.

37. The computer networked system of claim 32, wherein the location response is generated in such a manner as to render the included location information unusable if it is altered.

38. The computer networked system of claim 22, wherein the license is issued by the mobile device user such that any modification to the license invalidates the license.

39. A method of securely delivering location information of a mobile device to a location consumer, executed by a location information server, in response to a location request, the method comprising:

on the location information server, validating that the location request is authorized by the mobile device user, the location request including a license, wherein the license includes access conditions that identify conditions upon which the location consumer is authorized to access the location information of the mobile device, the access conditions comprising conditions of use based on at least one of the following:
a number of usages for which the license is valid,
at least one location for which the license is valid, and
at least one application for which the license is valid; and determining whether the license is valid, wherein determining whether the license is valid comprises:
verifying validity of a public key associated with the mobile device,
verifying validity of a identity certificate associated with the location consumer,
verifying validity of the access conditions associated with the license, and
determining if the license if one of: suspended and expired; and if the location request is authorized by the mobile device user:
obtaining location information of the mobile device;
generating a location response, the location response including the obtained location information, wherein generating the location response comprises:
diluting specificity of the location information,
identifying one of: geographic regions and areas in which the mobile device is located,
specifying which applications may use the location information, encrypting the location information in the location response; and
returning the location response to the location consumer.

40. The method of claim 39 wherein validating that the location request is authorized by the mobile device user comprises validating that the location license was issued by the mobile device user.

41. The method of claim 40, wherein validating that the location license was issued by the mobile device user comprises:
decrypting encrypted information in the location license using a decryption key associated with the mobile device user; and
validating that the resulting decrypted information indicates that the location license was issued by the mobile device user.

42. The method of claim 41, wherein the decryption key associated with the mobile device user is the mobile device user's public key, and the encrypted information in the location license was encrypted using the mobile device user's corresponding private key, such that data encrypted with the mobile device user's private key can only be validly decrypted by the mobile device user's corresponding public key.

43. The method of claim 42, wherein validating that the resulting decrypted information indicates that the location license was issued by the mobile device user comprises determining whether the encrypted information is properly decrypted by the mobile device user's public key.

44. The method of claim 43, wherein the location request further includes a location consumer identifier that uniquely identifies the location consumer issuing the location request;
wherein the resulting decrypted information includes a location consumer identifier uniquely identifying the location consumer to whom the location license is issued; and
wherein validating that the location request is authorized by the mobile device user further comprises determining whether the location consumer identifier in the location request corresponds to the location consumer identifier in the decrypted information.

45. The method of claim 40, wherein validating that the location request is authorized by the mobile device user comprises determining whether the location license has been revoked according to revocation information stored by the location information server.

46. The method of claim 40, wherein validating that the location request is authorized by the mobile device user comprises determining whether the location license is currently suspended according to suspension information stored by the location information server.

47. The method of claim 40 wherein validating that the location request is authorized by the mobile device user comprises determining whether the location request conforms to the access conditions identified in the location license.

48. The method of claim 40, wherein generating the location response comprises encrypting at least some of the location response, including the obtained location information, using an encryption key associated with the location consumer.

49. The method of claim 48, wherein the location request further includes the encryption key associated with the location consumer.

50. The method of claim 49, wherein the encryption key associated with the location consumer is the location consumer's public key of a public/private key pair, such that data encrypted with the location consumer's public key can only be decrypted by the location consumer's corresponding private key.

51. The method of claim 48, wherein the location license identifies use conditions for controlling how the location consumer may use the location information, and wherein generating the location response further comprises including the identified use conditions in the location response.

52. The method of claim 51, wherein the location license further identifies precision conditions that specify the precision of the location information returned to the location consumer, and wherein generating the location response further comprises processing the location information according to the precision conditions.

53. The method of claim 48, wherein generating the location response further comprises generating the location response in such a manner as to render the included location information unusable if it is altered.

54. A memory bearing computer-executable instructions which, when executed on a computing device, carry out a method of securely delivering location information of a mobile device to a location consumer in response to a location request, the method comprising:
validating that the location request is authorized by the mobile device user, the location request including a license, wherein the license includes access conditions that identify conditions upon which the location consumer is authorized to access the location information of the mobile device, the access conditions comprising conditions of use based on at least one of the following:
a number of usages for which the license is valid,
at least one location for which the license is valid, and
at least one application for which the license is valid;
determining whether the license is valid, wherein determining whether the license is valid comprises:
verifying validity of a public key associated with the mobile device,
verifying validity of a identity certificate associated with the location consumer,
verifying validity of the access conditions associated with the license, and
determining if the license is one of: suspended and expired; and
if the location request is authorized by the mobile device user:
obtaining the location information of the mobile device;
generating a location response, the location response including the obtained location information, wherein generating the location response comprises:
diluting specificity of the location information,
identifying one of: geographic regions and areas in which the mobile device is located,
specifying which applications may use the location information, encrypting
the location information in the location response; and
returning the encrypted location response to the location consumer.

* * * * *